UNITED STATES PATENT OFFICE.

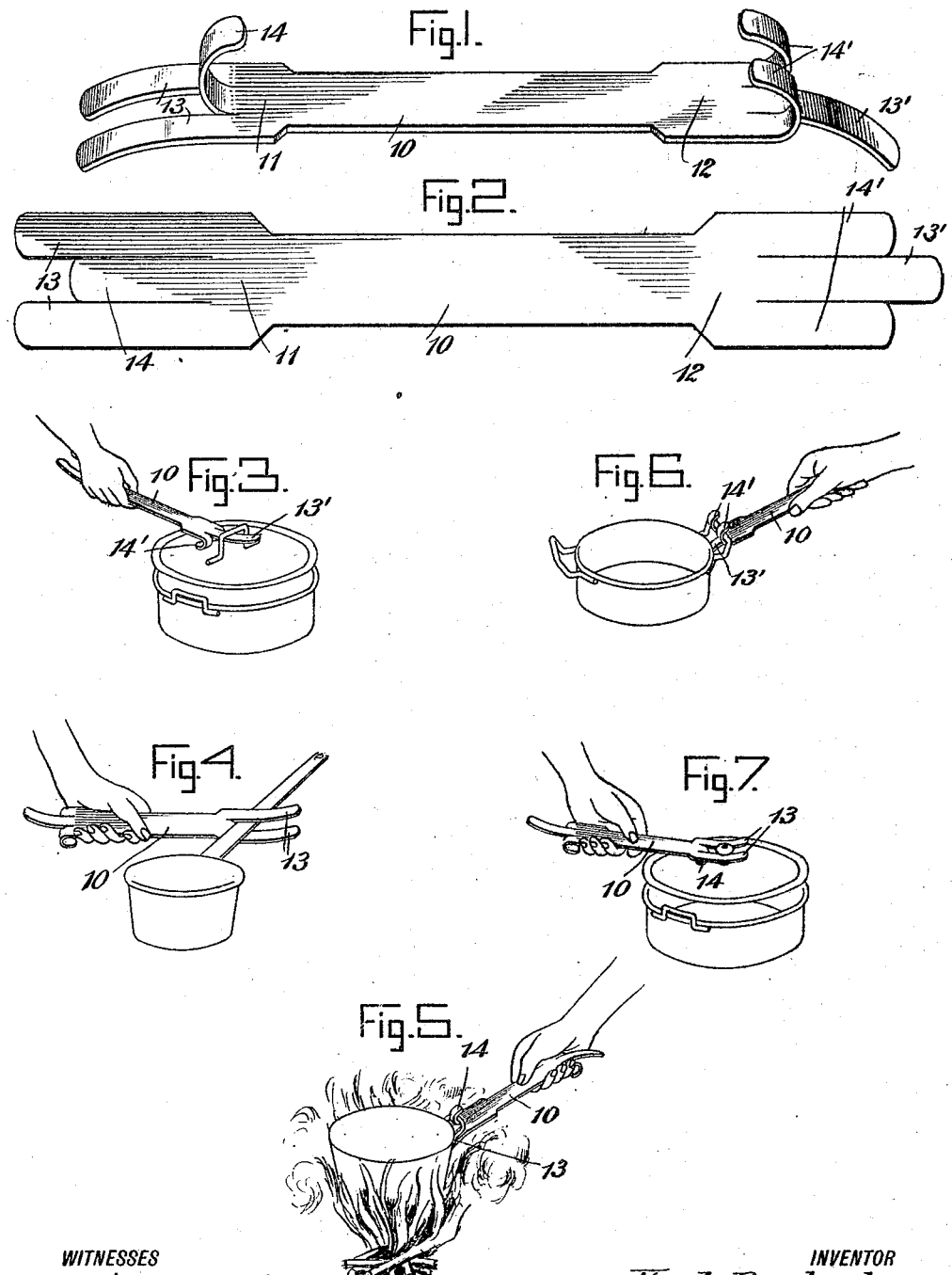

KARL PROCHASKA, OF VIENNA, AUSTRIA-HUNGARY.

POT AND COVER LIFTER.

1,134,905.

Specification of Letters Patent.   Patented Apr. 6, 1915.

Application filed May 8, 1914.  Serial No. 837,142.

*To all whom it may concern:*

Be it known that I, KARL PROCHASKA, a subject of the Emperor of Austria-Hungary, and a resident of Vienna, Austria-Hungary, have invented a new and Improved Pot and Cover Lifter, of which the following is a full, clear and exact description.

This invention relates to tools or implements for use more particularly in connection with cooking utensils or camping outfits.

Among the objects of the invention is to provide an implement of simple, cheap and strong construction, the same being provided with various engaging devices at its ends whereby the implement is adapted for numerous various uses.

The foregoing and other objects of the invention will hereinafter be more fully described and claimed and illustrated in the drawings forming a part of this specification in which like characters of reference indicate corresponding parts in all the views, and in which—

Figure 1 is a perspective view of a preferred form of the invention; Fig. 2 is a plan view of the blank from which the form of the invention in Fig. 1 is made; and Figs. 3, 4, 5, 6 and 7 are diagrams indicating some of the many uses to which the implement may be adapted.

An implement made in accordance with this invention may be constructed of any suitable material, preferably metal, and while I show it made of plate or sheet material, it is obvious that it may be formed of wire or otherwise skeletonized and yet partake of the same features of advantage. It is to be observed, also, that while the hooks and fingers constituting the engaging devices are shown preferably of curved form, said parts may be deflected angularly or otherwise, and the device as a whole may be made of different sizes or relative proportions without departing from the spirit of the invention hereinafter more fully set forth and specifically claimed.

As will be noted from Figs. 1 and 2, the implement comprises a main body portion 10 which may be substantially flat and straight, and at either end of the body 10 is formed a head 11 or 12. Each head is slitted longitudinally or parallel to the axis of the body forming a series of engaging devices shown as three in number for each head.

Referring to the head 11 said engaging devices consist of a pair of fingers 13 which are preferably of the same length and parallel to each other and are deflected laterally in one direction from the plane of the body 10, the deflection in this instance being in gentle curves. Between the fingers 13 is an engaging member in the form of a hook 14 which is deflected laterally from the plane of the body 10 in the direction opposite from the direction in which the fingers extend and also being curved or deflected to a greater extent. It will be observed, however, from Fig. 2 that the length of the engaging member constituting the hook is shorter than the fingers.

The head 12 is slitted similarly to the head 11 and likewise comprises a series of three engaging devices. These devices, however, comprise two hooks 14' which are bent or otherwise deflected laterally from the plane of the body 10 in the same direction and to the same extent, they being substantially similar in form and length to the hook 14 aforesaid. Between the hooks 14' is a finger 13' of a nature corresponding to the fingers 13 as to form and length and also being deflected laterally from the plane of the body 10 in a direction opposite from the direction of deflection of the hooks 14'. The hooks 14' also are preferably slightly shorter than the finger between them.

As above premised, this implement has proved to be exceedingly useful in connection with cooking stoves, bakeries or the like, for the handling of hot dishes or pottery, and also it has proved to be both convenient and useful in army outfits. Among the many uses to which it may be put I show in Fig. 3 its application to the lifting of a pot lid, the finger 13' in this application of the device being engaged under the ear or loop of the pot lid, and the other two engaging devices 14' constituting a broad fulcrum connection on the top of the lid, the body of the implement and the opposite head constituting a handle.

In Fig. 4 I show one means of gripping a vessel having a straight handle. In this application of the device the two fingers 13 are caused to straddle the handle of the utensil, and by twisting the implement around its longitudinal axis the utensil may be readily lifted.

Fig. 5 shows the manner of manipulating a cooking vessel having small or short ears or handles. By hooking the hook 14 upwardly through the ear or handle of the vessel, the fingers 13 will bear in spaced relation to each other against the outside wall of the vessel, constituting a rigid support for the device as a whole, the device being regarded in this application of the invention as a rigid handle for the vessel.

Fig. 6 indicates an application of the implement to a cooking vessel in somewhat the same manner as just set forth in Fig. 5, but the handle of this vessel being wider it is adapted to receive the two hooks 14', leaving the single finger 13' coöperating with the outside wall of the vessel and acting as a brace for the implement as a whole.

Fig. 7 is a view similar in nature to Fig. 3, but showing the adaptation of the invention to a pot lid having a knob as distinguished from one having an ear or loop at its top.

Having thus described my invention, I claim as new and desire to secure by Letters Patent:—

The herein described implement formed of sheet metal of uniform thickness and comprising a rigid handle, having at one end a head slitted to form a series of three fingers of uniform width, the two outer fingers being of the same length and bent laterally from the plane of the handle head and thence toward the handle forming parallel hooks, and the intermediate finger being longer than the other two, and being curved slightly from the plane of the handle and head on the side thereof opposite said hooks, substantially as set forth.

In testimony whereof I have signed my name to this specification in the presence of two subscribing witnesses.

KARL PROCHASKA.

Witnesses:
AUGUST FUGGER,
ALFRED EVLERVAN SCHMERSFUHRER.